United States Patent [19]

Rabii

[11] Patent Number: 4,935,806
[45] Date of Patent: Jun. 19, 1990

[54] CHROMA NOISE REDUCTION AND TRANSIENT IMPROVEMENT

[75] Inventor: Khosro M. Rabii, Arlington Heights, Ill.

[73] Assignee: Zenith Electronics Corporation, Glenview, Ill.

[21] Appl. No.: 292,582

[22] Filed: Dec. 30, 1988

[51] Int. Cl.$^5$ .............................................. H04N 5/21
[52] U.S. Cl. ..................................................... 358/37
[58] Field of Search ............................ 358/36, 37, 40

[56] References Cited

U.S. PATENT DOCUMENTS

| | | | |
|---|---|---|---|
| 4,613,905 | 9/1986 | Ichinoi | 358/36 |
| 4,698,673 | 10/1987 | Johnson | 357/37 |
| 4,706,112 | 11/1987 | Faroudja | 358/36 |
| 4,766,486 | 8/1988 | Ozaki | 358/40 |
| 4,803,547 | 2/1989 | Stratton | 358/40 |
| 4,809,070 | 2/1989 | Lake, Jr. | 358/37 |

Primary Examiner—Tommy P. Chin

[57] ABSTRACT

A digital chroma signal processor samples groups of three successive pixels and develops first and second difference signals therefrom. The first difference signals indicate changes in color and the second difference signal peaks those changes when combined with the original signal. A threshold detector determines when the changes are great enough to need peaking and operates a multiplexer that supplies a transient enhanced signal for a chroma signal above the threshold or a median signal for a chroma signal below the threshold. The median signal is developed for each sample group, along with minimum and maximum signals, by a criteria filter. A limiting coefficient adjusts the minimum and maximum signals to provide controlled amounts of overshoot and undershoot in the processed chroma signal.

25 Claims, 3 Drawing Sheets

| X(N) > X(N-2)? | X(N-1) > X(N-2)? | X(N) > X(N-1)? | MAX | MIN | MEDIAN |
|---|---|---|---|---|---|
| 0 | 0 | 0 | X(N-2) | X(N) | X(N-1) |
| 0 | 0 | 1 | X(N-2) | X(N-1) | X(N) |
| 0 | 1 | 0 | X(N-1) | X(N) | X(N-2) |
| 0 | 1 | 1 | — | — | — |
| 1 | 0 | 0 | — | — | — |
| 1 | 0 | 1 | X(N) | X(N-1) | X(N-2) |
| 1 | 1 | 0 | X(N-1) | X(N-2) | X(N) |
| 1 | 1 | 1 | X(N) | X(N-2) | X(N-1) |

1 = YES
0 = NO
— = INVALID STATE

CHROMA NOISE REDUCTION AND TRANSIENT IMPROVEMENT

BACKGROUND OF THE INVENTION AND PRIOR ART

This invention relates generally to chrominance signal (chroma) processing circuits and specifically to a chroma processing circuit and method for a digitized chroma signal. NTSC type color signals have a chroma bandwidth that is quite narrow in comparison with the luminance signal (luma) bandwidth. Chroma noise is quite noticeable to the viewer, especially in flat color areas. The limited frequency bandwidth of the chroma signal produces relatively slow chroma transitions which are also not desirable since they detract from sharp color demarcations. There have been numerous attempts in the prior art to enhance slow chroma transitions by adding additional signals, such as a second differential signal. The conflicting requirements of low noise and fast transitions have resulted in many design compromises.

In digital television systems, the chroma signals take the form of discrete pixels. Digital processing may be performed on these digital signals to perform various enhancement techniques. The present invention derives a first difference signal to indicate activity or change in the chroma signal. A second difference signal enhances or sharpens these changes or transitions when added to the original chroma signal. Groups of pixels are sampled and a median, a minimum and a maximum are determined. The median signal is supplied when the first difference signal is below an established threshold and the transient enhanced signal is supplied when the signal is above the threshold. The minimum and maximum signals are used to limit the undershoot and overshoot of the transient enhanced signal. Consequently, the processed color signal is optimized by either being noise reduced or transient enhanced. The invention will be seen to embrace a number of different aspects, namely, selectively noise reducing and transient enhancing a chroma signal; developing a transient enhanced chroma signal with controlled undershoot and overshoot characteristics; and the combination of a multiplexed chroma signal that is either noise reduced or transient enhanced with maximum and minimum limits for controlling overshoot and undershoot.

OBJECTS OF THE INVENTION

A principal object of the invention is to provide a novel chroma processing system and method.

Another object of the invention is to provide a digital chroma processing system and method of enhanced characteristics.

A further object of the invention is to provide a digitized chroma signal of enhanced characteristics.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
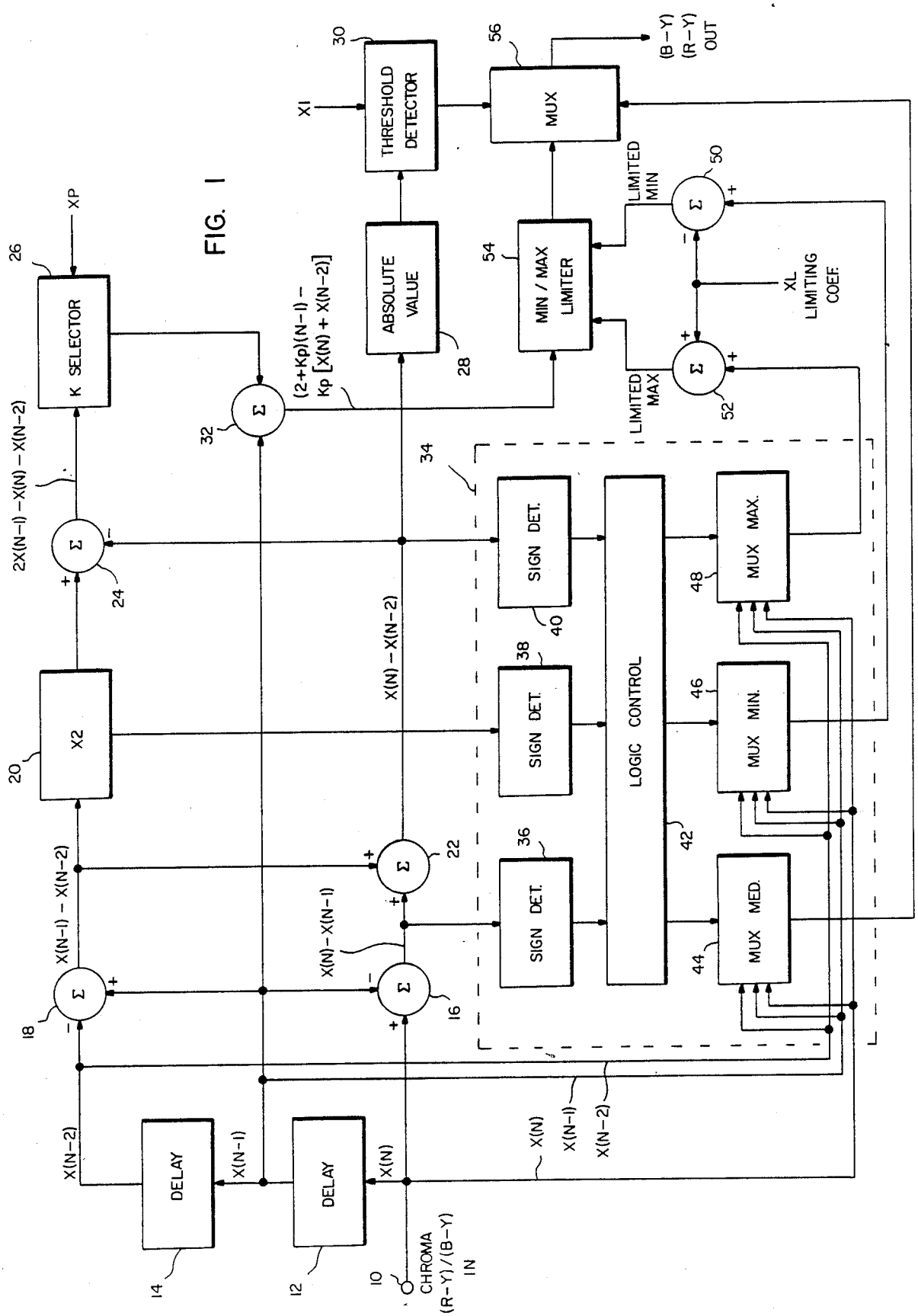
FIG. 1 is a partial block diagram illustrating the chroma processing method and system of the invention.

Referring to FIG. 1, there is shown a chroma signal processor constructed in accordance with the invention. The remainder of the color television receiver is omitted for clarity since the inventive chroma processor is not dependent thereon. Certain programmable characteristics and coefficients are indicated on FIG. 1. These are supplied by a microprocessor (not shown) that is included in the digital television receiver incorporating the invention. For example, the digital television receiver described in ITT publication, Digit 2000-VSLI Digital TV System, may be used with the chroma enhancement circuit of the present invention.

A digitized chroma signal, in the form of R-Y and B-Y, is applied at input terminal 10 and is supplied to a first pixel delay circuit 12 and to a second pixel delay circuit 14. The digitized signal includes a series of pixels or signals identified as X(N) at the input terminal 10, X(N-1) at the output of delay circuit 12, and X(N-2) at the output of delay circuit 14. Pixels are sampled in groups of three adjacent pixels N, (N-1) and (N-2). Signal X(N) is supplied to a summer 16 along with signal -X(N-1). A summer 18 is supplied with signal X(N-1) and signal -X(N-2). The output of summer 16, which comprises a first difference signal X(N)-X(N-1), is applied to the positive input of a summer 22 which is also supplied with the positive output of summer 18. The output of summer 22 is signal X(N) and signal -X(N-2) which comprises another first difference signal identified as X(N)-X(N-2). The output of summer 18 is applied to a 2X multiplier 20 where it is multiplied by a factor of two and applied to the positive input of a summer 24 along with the negative output of summer 22. The output of summer 24, which consists of the difference between two first difference signals, comprises a second difference signal. The second difference signal is applied to a K selector 26 that is supplied with a programmable number or value XP for adjusting the values of the output of summer 24. These adjustments will shape or tailor the second difference signal to that desired for transient enhancement. A summer 32 is supplied with the output of K selector 26 and the X(N-1) signal, which is an unmodified chroma signal. The output of summer 32 is seen to consist of the original chroma signal with transient enhancement. This signal however may exhibit significant undershoot and overshoot because of the transient enhancement, i.e., speed up. The amount of undershoot and overshoot and the degree of transient enhancement is a function of K selector 26. As mentioned, XP may be a factory adjustment. The output of summer 22, which is a first difference signal, is supplied to an absolute value circuit 28 where its magnitude is determined, apart from its polarity, and applied to a threshold detector 30, the threshold level of which is determined by a programmable constant X1. The output of threshold detector 30 is applied as a switching signal to a multiplexer circuit 56.

A criteria filter 34 (indicated by the dashed line box) includes a plurality of sign detectors 36, 38 and 40, a logic control block 42 and three multiplexers 44, 46 and 48 labelled medium, minimum and maximum, respectively. Sign detector 36 is coupled to the output of summer 16, sign detector 38 to the output of multiplier 20 and sign detector 40 is coupled to the output of summer 22. The sign detectors each supply logic control block 42 that has three outputs for driving multiplexers 44, 46 and 48. The multiplexers are each supplied with three inputs corresponding to the X(N), X(N-1) and X(N-2) pixel or signal values.

Figures 2, 3:
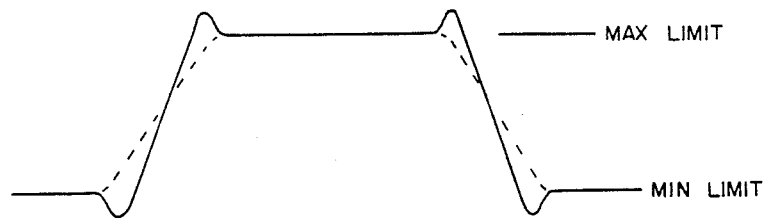
FIG. 2 is a truth table for the criteria filter of the invention.
FIG. 3 is a waveform illustrating the transient enhancement effect of the invention.

Reference to FIG. 2 indicates the truth table for the criteria filter 34. As indicated, when X(N) is greater than X(N-2) the underlying column includes a 1. Similarly, when X(N-1) is greater than X(N-2) and X(N) is greater than X(N-1), the underlying respective columns are similarly marked. The MAX, MIN and MEDIAN columns indicate the corresponding pixel values for the various input combinations. The unmarked states cannot exist in reality and are invalid. The truth table indicates the outputs that will appear with the various combinations of input pixels applied. The output of median multiplexer 44 is directly supplied to multiplexer 56. The output of minimum and maximum multiplexers 46 and 48, respectively, are applied as positive inputs to a pair of summers 50 and 52, respectively. A limiting coefficient XL is applied as a negative input to summer 50 and as a positive input to summer 52. The output of summer 50 is thus a limited minimum value and is applied to a min/max limiter 54. Similarly, the output of summer 52 is a limited max value and is applied to limiter 54. The signal input to limiter 54 is from summer 32 which, it will be recalled, is the enhanced transient signal. The output of limiter 54 is applied as an input to multiplexer 56. The output of multiplexer 56 is the enhanced R-Y/B-Y chroma signal or the median pixel from multiplexer 44.

In operation, successive groups of three pixels are processed to form the first and second difference signals. A first difference signal will represent the magnitude of a change or transition. When the first difference signal is low, it indicates that there are no significant chroma transitions in the sample and therefore it is desirable to merely process the chroma signal for noise reduction. This is accomplished by supplying the median value of the sample group. When the first difference signal is high, it indicates that there are significant chroma transitions and it is desired to peak or enhance those transitions which are necessarily slow because of the chroma channel limited bandwidth. If the first difference signal is below the threshold determined by X1, the median value of the sampled pixel group is supplied as the output of the chroma enhancer. If the value of the first difference signal is above the threshold, the transient enhanced signal is supplied. The second difference signal, when added to the original chroma signal, provides the transient enhancement. Overshoots and undershoots created by the enhancement are limited by utilizing the maximum and minimum values of pixels in the corresponding multiplexers to limit the signals.

The result of the enhanced chroma processing of the invention is illustrated in FIG. 3 in which the dashed line waveform represents an original chroma signal and the solid line represents the chroma signal with the transitions enhanced so that they are much steeper. The undershoot and overshoot resulting from the transient enhancement are controlled by the max and min limits of the original chroma signal. The summers 50 and 52 (FIG. 1) allow for the limiting coefficient XL to modify the minimum/maximum pixel values in multiplexers 46 and 48 to provide a controllable degree of overshoot and undershoot. Thus the manufacturer also has control of the amount of overshoot and undershoot that is desired in the processed chroma signal.

With the invention, full control of the digital chroma signal is available. It will be appreciated that the chroma signal is very narrow in bandwidth (under 1 MHz) and that with the techniques of the invention, low noise and sharp transitions are available despite the limited bandwidth. It is recognized that numerous modifications and changes in the described embodiment of the invention will be apparent to those skilled in the art without departing from its true spirit and scope. The invention is to be limited only as defined in the claims.

What is claimed is:

1. A method of processing a chroma signal having a transient response comprising the steps of:
   establishing a chroma signal transient threshold;
   reducing noise in said chroma signal below said transient threshold; and
   enhancing the transient response of said chroma signal above said transient threshold.

2. The method of claim 1, further comprising the steps of:
   sampling said chroma signal to develop a median value chroma signal;
   developing a transient enhanced chroma signal; and
   selectively supplying said median value chroma signal and said transient enhanced chroma signal based upon the relationship between the magnitude of transients in said chroma signal and said threshold.

3. The method of claim 2 wherein said chroma signal is sampled to develop a second difference signal for developing said transient enhanced chroma signal.

4. The method of claim 3, further comprising the steps of:
   developing first difference signals and said second difference signal from samples of said chroma signal, said first difference signals being used to develop said second difference signal;
   deriving said median value chroma signal from said samples;
   developing said transient enhanced chroma signal by combining said chroma signal with said second difference signal; and
   operating a multiplexer, controlled by said transient threshold and said first difference signals, to selectively supply said median value chroma signal and said transient enhanced chroma signal.

5. A method of processing a digitized chroma signal comprising the steps of:
   sampling said chroma signal to develop two first difference signals;
   producing a second difference signal from said first difference signals;
   developing a median value chroma signal from samples of said chroma signal;
   developing a transient enhanced chroma signal by combining said chroma signal with said second difference signal;
   establishing a threshold value for said chroma signal; and
   supplying said median value chroma signal when the sum of said first difference signals is below said threshold value and supplying said transient enhanced chroma signal when said sum of said first difference signals is above said threshold value.

6. A chroma signal processor comprising:
   means for sampling a chroma signal;
   means for determining a median value of said chroma signal from said samples;

means for developing a transient enhanced chroma signal with transients in said chroma signal enhanced; and means for selectively supplying said median value chroma signal and said transient enhanced chroma signal based upon the relationship of the magnitude of said transients in said chroma signal to a threshold level.

7. The processor of claim 6, further including:

means for developing a first difference signal from said samples;

means for developing a second difference signal from said samples;

means combining said chroma signal with said second difference signal to develop said transient enhanced chroma signal; and means for comparing the magnitude of said first difference signal to said threshold level for determining said relationship.

8. The processor of claim 7, further including:

multiplexing means having inputs of said median value chroma signal and said transient enhanced chroma signal; and means for operating said multiplexing means based upon said relationship.

9. A method of processing a chroma signal comprising the steps of:

sampling a chroma signal to determine maximum and minimum values thereof;

generating a transient enhanced chroma signal; and limiting said transient enhanced chroma signal with said maximum and minimum values.

10. The method of claim 9, wherein said sampling and generating steps further comprise the steps of:

taking groups of samples of said chroma signal;

determining said maximum and minimum values from each said group of samples;

deriving two first difference signals from each said group of samples;

deriving a second difference signal from said two first difference signals; and combining said chroma signal with said second difference signal to generate said transient enhanced chroma signal.

11. The method of claim 10 wherein said transient enhanced chroma signal is limited by a limiter having limits determined by said maximum and minimum values.

12. The method of claim 11, further including means for adjusting said maximum and minimum values to adjust the undershoot and overshoot of said transient enhanced chroma signal.

13. A method of processing a digitized chroma signal comprising the steps of:

developing a sample of said chroma signal;

determining maximum and minimum values of said sample;

developing a second difference signal from said samples;

combining said chroma signal and said second difference signal to produce a transient enhanced chroma signal; and limiting said transient enhanced chroma signal with said maximum and minimum values.

14. A chroma signal processor comprising:

means for sampling a chroma signal to produce groups of samples;

means for determining maximum and minimum values of said samples in each group;

means for developing a transient enhanced chroma signal; and means for limiting said transient enhanced chroma signal with said maximum and minimum values.

15. The processor of claim 14 including:

means for developing first difference signals from said groups of samples;

means for developing a second difference signal from said first difference signals; and means for combining said chroma signal with said second difference signal to develop said transient enhanced chroma signal.

16. The processor of claim 15, further including means for adjusting said maximum and minimum values for controlling the amount of undershoot and overshoot in said transient enhanced chroma signal.

17. A method of processing a chroma signal comprising the steps of:

developing a maximum, a minimum and a median value chroma signals;

establishing a signal threshold;

developing a limited transient enhanced chroma signal limited by said maximum and minimum value chroma signals;

processing portions of said chroma signal that are below said signal threshold to reduce noise by supplying said median value chroma signal; and processing portions of said chroma signals that are above said signal threshold to improve transient response by supplying said limited transient enhanced chroma signal.

18. The method of claim 17 wherein said chroma signal is digitized and further comprising the steps of:

delaying said chroma signal and subtracting said delayed chroma signal from said chroma signal to develop first difference signals;

developing a second difference signal from said first difference signals;

combining said second difference signal with said chroma signal to develop said limited transient enhanced chroma signal; and multiplexing said median value chroma signal and said limited transient enhanced chroma signal based upon the relationship of said first difference signals and said threshold.

19. The method of claim 18 wherein said digitized chroma signal consists of a sequence of pixels and is sampled in groups with three pixels comprising each sample group.

20. A method of processing a digital chroma signal comprising the steps of:

delaying said chroma signal;

deriving first difference signals from samples of said delayed chroma signal;

deriving a second difference signal from said first difference signals;

deriving median, minimum and maximum value chroma signals from said samples;

developing a transient enhanced chroma signal by combining said second difference signal with said chroma signal;

limiting said transient enhanced chroma signal with said maximum and minimum values to produce a limited transient enhanced chroma signal;

establishing a threshold; and multiplexing said limited transient enhanced chroma signal and said median value chroma signal based upon the magnitude of said threshold and said first difference signals.

21. A method of processing a digital chroma signal consisting of pixels comprising the steps of:

sampling said pixels in groups of three pixels;

developing two first difference signals from said sample;

developing a second difference signal from said first difference signals;

determining the maximum, minimum and median values of said pixels in each said group from said samples;

developing a transient enhanced chroma signal by combining said chroma signal with said second difference signal;

limiting said transient enhanced chroma signal with said maximum and minimum values to develop a limited transient enhanced chroma signal;

establishing a threshold; and multiplexing said limited transient enhanced chroma signal with said median pixel value based upon the relative magnitudes of said first difference signals and said threshold.

22. A digital chroma signal processor comprising:

means for developing maximum, minimum and median values of a chroma signal;

means for developing a transient enhanced signal from said chroma signal;

means for establishing a threshold;

means for limiting said transient enhanced signal with said maximum and minimum values to develop a limited transient enhanced signal; and means for multiplexing said limited transient enhanced signal with said median value of said chroma signal based upon the magnitudes of said chroma signal and said threshold.

23. The processor of claim 22 wherein said chroma signal comprises a series of pixels, further including:

means for sampling said chroma signal in groups of three pixels each;

means for deriving a second difference signal from each of said groups of pixels; and means for combining said chroma signal with said second difference signal to develop said transient enhanced signal.

24. The processor of claim 23, further including means for deriving a first difference signal from each of said group of pixels, and wherein said multiplexing means includes a multiplexer supplied with said median value and said limited transient enhanced signal, said multiplexer being controlled by the relationship of said first difference signal to said threshold.

25. The processor of claim 24, further including means for adjusting said maximum and minimum values to change the undershoot and overshoot characteristics of said limited transient enhanced signal.

* * * * *